US012060031B2

(12) United States Patent
Inoue

(10) Patent No.: US 12,060,031 B2
(45) Date of Patent: Aug. 13, 2024

(54) GAS GENERATOR

(71) Applicant: NIPPON KAYAKU KABUSHIKI KAISHA, Chiyoda-ku (JP)

(72) Inventor: Yuji Inoue, Himeji (JP)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 80 days.

(21) Appl. No.: 18/001,414

(22) PCT Filed: Apr. 13, 2021

(86) PCT No.: PCT/JP2021/015308
§ 371 (c)(1),
(2) Date: Dec. 9, 2022

(87) PCT Pub. No.: WO2021/256067
PCT Pub. Date: Dec. 23, 2021

(65) Prior Publication Data
US 2023/0202422 A1 Jun. 29, 2023

(30) Foreign Application Priority Data
Jun. 15, 2020 (JP) .................... 2020-103130

(51) Int. Cl.
*B60R 21/264* (2006.01)
*B60R 21/26* (2011.01)
*F42B 3/04* (2006.01)

(52) U.S. Cl.
CPC ........ *B60R 21/2644* (2013.01); *B60R 2021/26029* (2013.01); *F42B 3/04* (2013.01)

(58) Field of Classification Search
CPC .............. B60R 21/264; B60R 21/2644; B60R 21/26029; B60R 21/26011; B60R 21/2648; F42B 3/00; F42B 3/04
See application file for complete search history.

(56) References Cited

U.S. PATENT DOCUMENTS 4,249,673 A * 2/1981 Katoh ............ F23B 7/00
222/3
D643,442 S * 8/2011 Sato .................. D15/9
(Continued)

FOREIGN PATENT DOCUMENTS

DE  20 2005 009 407 U1  12/2005
JP  2017-7456 A  1/2017
(Continued)

OTHER PUBLICATIONS

International Search Report mailed on Jun. 8, 2021 in PCT/JP2021/015308 filed on Apr. 13, 2021 (2 pages).

*Primary Examiner* — Joshua E Freeman
(74) *Attorney, Agent, or Firm* — Oblon, McClelland, Maier & Neustadt, L.L.P.

(57) ABSTRACT

A gas generator includes an igniter assembled to one end portion of a housing, a gastight container arranged in the inside of the housing, and a coil spring interposed between the one end portion of the housing and the gastight container. The gastight container melts or bursts as a result of activation of the igniter. A gas generating agent is accommodated in the gastight container. The coil spring serves to fix the gastight container in the inside of the housing. The coil spring is arranged substantially coaxially with an ignition portion to surround the ignition portion without interposition of another member between the coil spring and the ignition portion, so as to restrict a degree of opening of a cup body included in the ignition portion of the igniter at the time of cleavage of the cup body.

5 Claims, 9 Drawing Sheets

(56) References Cited

U.S. PATENT DOCUMENTS

| | | | |
|---|---|---|---|
| 8,573,644 B1* | 11/2013 | Mayville | B60R 21/261 |
| | | | 280/741 |
| 8,783,188 B1* | 7/2014 | Mayville | B60R 21/2644 |
| | | | 280/741 |
| 9,902,364 B2* | 2/2018 | Imai | B60R 21/2646 |
| 10,793,099 B2* | 10/2020 | Esau | B60R 21/2644 |
| 10,870,409 B2* | 12/2020 | Imai | B60R 21/2644 |
| 10,953,842 B2* | 3/2021 | Imai | B60R 21/2646 |
| 11,052,865 B2* | 7/2021 | Hiraoka | B60R 21/264 |
| 2010/0045009 A1 | 2/2010 | Kelley et al. | |
| 2011/0265678 A1* | 11/2011 | Sasamoto | B60R 21/2644 |
| | | | 102/530 |
| 2012/0042801 A1* | 2/2012 | Sasamoto | C06D 5/06 |
| | | | 102/530 |
| 2012/0048137 A1* | 3/2012 | Hagihara | C06D 5/06 |
| | | | 102/530 |
| 2012/0125219 A1* | 5/2012 | Mayville | C06D 5/06 |
| | | | 280/741 |
| 2014/0230685 A1* | 8/2014 | Hanano | B60R 21/2644 |
| | | | 102/530 |
| 2017/0210333 A1* | 7/2017 | Imai | B60R 21/262 |
| 2018/0154859 A1* | 6/2018 | Kubo | B60R 21/2644 |
| 2018/0304848 A1* | 10/2018 | Imai | B60R 21/2644 |
| 2019/0047508 A1* | 2/2019 | Esau | F42B 3/04 |
| 2019/0077360 A1* | 3/2019 | Imai | B60R 21/2644 |
| 2019/0351863 A1* | 11/2019 | Ramp | B60R 21/272 |
| 2020/0023805 A1* | 1/2020 | Hiraoka | F42B 3/24 |
| 2021/0129788 A1* | 5/2021 | Hagihara | B21J 5/025 |
| 2023/0202422 A1* | 6/2023 | Inoue | B60R 21/2644 |
| | | | 102/530 |

FOREIGN PATENT DOCUMENTS

| | | |
|---|---|---|
| JP | 2017-193192 A | 10/2017 |
| JP | 2018-69924 A | 5/2018 |
| WO | WO 2017/183626 A1 | 10/2017 |

* cited by examiner

FIG.9

| | PRESENCE OF COMBUSTION CONTROL COVER | COIL SPRING | | | | CLEARANCE [mm] | MANUFACTURING COST | OUTPUT INDICATOR [ms] | GAS OUTPUT CHARACTERISTIC | TOTAL EVALUATION |
|---|---|---|---|---|---|---|---|---|---|---|
| | | INNER DIAMETER [mm] | DIAMETER [mm] | FREE LENGTH [mm] | THE NUMBER OF TURNS [TURNS] | | | | | |
| COMPARATIVE EXAMPLE 1 | YES | 15.1 | 1.0 | 18.5 | 3.75 | 3.5 | SATISFACTORY | 2.0 | GOOD | GOOD |
| COMPARATIVE EXAMPLE 2 | NO | 15.1 | 1.0 | 18.5 | 3.75 | 3.5 | GOOD | 2.4 | SATISFACTORY | SATISFACTORY |
| VERIFICATION EXAMPLE 1 | NO | 9.0 | 0.5 | 18.5 | 15 | 0.4 | GOOD | 1.9 | GOOD | OUTSTANDING |
| VERIFICATION EXAMPLE 2 | NO | 9.0 | 0.8 | 18.5 | 9 | 0.4 | GOOD | 1.9 | GOOD | OUTSTANDING |
| VERIFICATION EXAMPLE 3 | NO | 9.0 | 1.2 | 18.5 | 6 | 0.4 | GOOD | 1.9 | GOOD | OUTSTANDING |
| VERIFICATION EXAMPLE 4 | NO | 10.0 | 0.8 | 18.5 | 9 | 0.9 | GOOD | 2.0 | GOOD | OUTSTANDING |
| VERIFICATION EXAMPLE 5 | NO | 12.0 | 0.8 | 18.5 | 9 | 1.9 | GOOD | 2.3 | SATISFACTORY | SATISFACTORY |

GAS GENERATOR

TECHNICAL FIELD

The present invention relates to a gas generator incorporated in an air bag apparatus as a passenger protection apparatus equipped in a car and the like, and particularly to what is called a cylinder type gas generator having an elongated columnar outer geometry that is suitably incorporated into a side air bag apparatus and the like.

BACKGROUND ART

From a point of view of protection of a driver and/or a passenger in a car, an air bag apparatus which is a passenger protection apparatus has conventionally widely been used. The air bag apparatus is equipped for the purpose of protecting a driver and/or a passenger against shock caused at the time of collision of a vehicle, and it receives a body of a driver or a passenger with the air bag serving as a cushion by instantaneously expanding and developing the air bag at the time of collision of a vehicle.

A gas generator is equipment which is incorporated in this air bag apparatus, an igniter therein being ignited in response to power feed through a control unit at the time of collision of a vehicle to thereby burn a gas generating agent with flame caused by the igniter and instantaneously generate a large amount of gas, and thus expands and develops an air bag.

Depending on a position of installation in a vehicle and the like or on specifications such as output, gas generators of various constructions are available. A gas generator called a cylinder type gas generator represents one example. The cylinder type gas generator has an outer geometry in an elongated columnar shape and it is suitably incorporated in a side air bag apparatus, a curtain air bag apparatus, a knee air bag apparatus, or a seat cushion air bag apparatus.

Normally, in a cylinder type gas generator, an igniter is assembled at one end portion in an axial direction of a housing, a combustion chamber accommodating a gas generating agent is provided on a side of the one end portion, a filter chamber accommodating a filter is provided on a side of the other end portion in the axial direction of the housing, and a gas discharge opening is provided in a circumferential wall portion of the housing in a portion defining the filter chamber.

In the cylinder type gas generator thus constructed, gas generated in the combustion chamber flows into the filter chamber along the axial direction of the housing and passes through the filter, and the gas which has passed through the filter is discharged to the outside through the gas discharge opening.

In general, in a gas generator, it is important that a gas generating agent is hermetically sealed from the outside, because desired gas output characteristics may not be obtained when the gas generating agent absorbs moisture.

A method of accommodating a gas generating agent in a gastight container formed from a relatively weak member which melts or bursts with heat or a pressure generated by activation of an igniter and arranging the gastight container in the housing is available as a method of preventing the gas generating agent from absorbing moisture in a cylinder type gas generator. A cylinder type gas generator in accordance with this method is disclosed, for example, in of Japanese Patent Laying-Open No. 2018-69924 (PTL 1).

In the cylinder type gas generator disclosed in the literature, a coil spring that biases the gastight container toward the other end portion of the housing is provided between the gastight container arranged in the inside of the housing and the one end portion of the housing to which the igniter is assembled. The coil spring serves to fix the gastight container in the inside of the housing while it appropriately maintains a distance from the igniter assembled to the one end portion of the housing to the gas generating agent accommodated in the gastight container.

In the gas generator disclosed in the literature, a substantially cylindrical combustion control cover made of a metal is provided on a side of the one end portion of the housing to cover an ignition portion of the igniter which is portion where the ignition agent is accommodated. The combustion control cover serves to efficiently guide thermal particles produced in the igniter at the time of activation to the gas generating agent, and more specifically to give directivity in a direction of travel of thermal particles produced in the ignition portion.

With the cylinder type gas generator constructed as such, good gas output characteristics at the time of activation can be obtained.

CITATION LIST

Patent Literature

PTL 1: Japanese Patent Laying-Open No. 2018-69924

SUMMARY OF INVENTION

Technical Problem

With the cylinder type gas generator constructed above, however, a large number of components should be provided in a portion on the side of the above-described one end portion of the housing. Therefore, not only the number of components is large but also assembly works are complicated. Consequently, manufacturing cost disadvantageously increases. Reduction in number of components could also bring about reduction in weight of the gas generator as a whole.

Therefore, the present invention was made in view of the problems described above, and an object thereof is to provide a gas generator capable of achieving both of reduction in weight and reduction in manufacturing cost while good gas output characteristics are maintained.

Solution to Problem

A gas generator based on the present invention includes a housing, a gas generating agent, an igniter, a gastight container, and a coil spring. The housing is formed from an elongated cylindrical member having axial one and the other end portions closed and having a circumferential wall portion. The gas generating agent is arranged in the inside of the housing. The igniter includes an ignition portion where an ignition agent for burning the gas generating agent is accommodated, and is assembled to the one end portion of the housing such that the ignition portion protrudes toward the inside of the housing. The gastight container is arranged in the inside of the housing, defines a gas generating agent accommodation chamber where the gas generating agent is accommodated, and is formed from a member that melts or bursts with heat or a pressure generated by activation of the igniter. The coil spring is interposed between the one end portion of the housing and the gastight container and is a member that fixes the gastight container in the inside of the housing by biasing the gastight container toward the other end portion of the housing. The ignition portion includes a cup body cleaved by ignition of the ignition agent at the time of activation of the igniter. In the gas generator based on the present invention, the coil spring is arranged substantially coaxially with the ignition portion to surround the ignition portion without interposition of another member between the coil spring and the ignition portion, so as to restrict a degree of opening of the cup body at the time of cleavage of the cup body.

In the gas generator based on the present invention, the ignition portion may have a substantially columnar outer geometry, and in that case, the coil spring may have a substantially cylindrical outer geometry.

In the gas generator based on the present invention, preferably, a condition of $0 < C \leq (R1-R2) \times (L2/L1)/2$ is satisfied, where R1 represents an inner diameter of the gas generating agent accommodation chamber, R2 represents an outer diameter of the ignition portion, L1 represents a distance along an axial direction of the housing from a portion of the ignition portion where the ignition agent is accommodated to the gas generating agent accommodation chamber, L2 represents a distance along the axial direction of the housing from the portion of the ignition portion where the ignition agent is accommodated to the gastight container, and C represents a clearance between the ignition portion and a surrounding portion which is a portion of the coil spring surrounding the ignition portion.

In the gas generator based on the present invention, preferably, the clearance is not larger than 1.0 [mm].

In the gas generator based on the present invention, a surrounding portion which is a portion of the coil spring surrounding the ignition portion may be in contact with the ignition portion.

Advantageous Effects of Invention

According to the present invention, a gas generator capable of achieving both of reduction in weight and reduction in manufacturing cost while good gas output characteristics are maintained can be provided.

BRIEF DESCRIPTION OF DRAWINGS

FIG. 9 shows a table of a test condition and a test result in a verification test.

DESCRIPTION OF EMBODIMENTS

Figure 1:
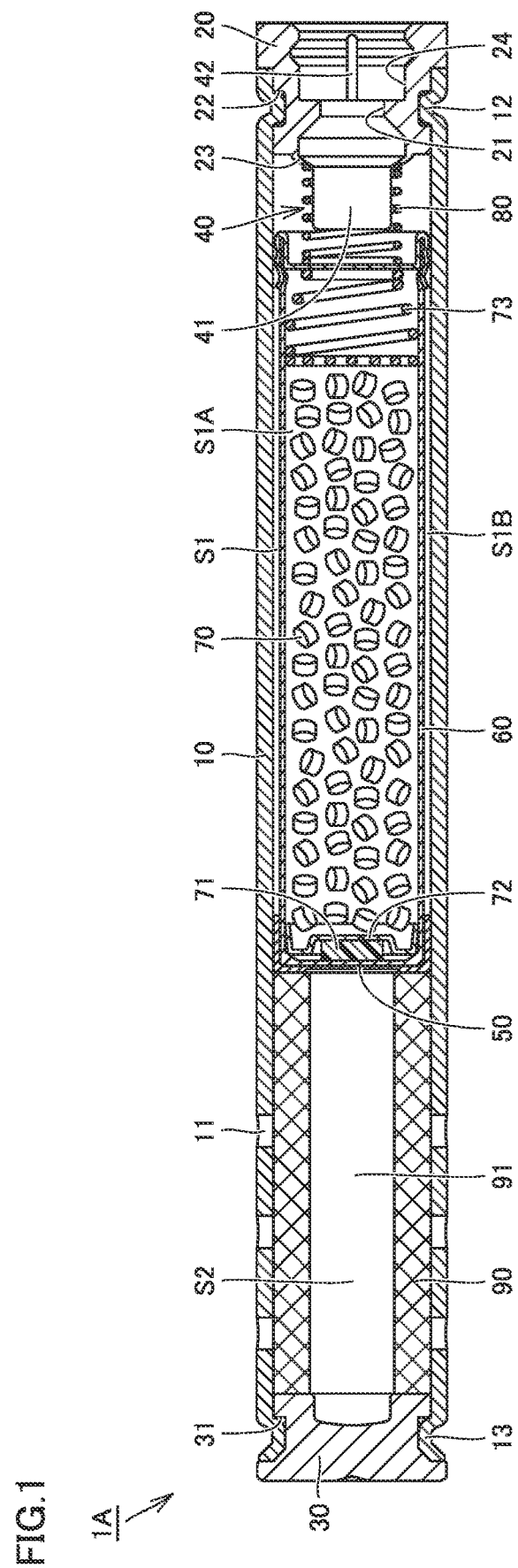
FIG. 1 is a schematic diagram of a cylinder type gas generator according to a first embodiment.

An embodiment of the present invention will be described hereinafter in detail with reference to the drawings. An embodiment shown below represents application of the present invention to a cylinder type gas generator incorporated in a side air bag apparatus. The same or common elements in an embodiment shown below have the same reference characters allotted in the drawings and description thereof will not be repeated.

First Embodiment

Figure 2:
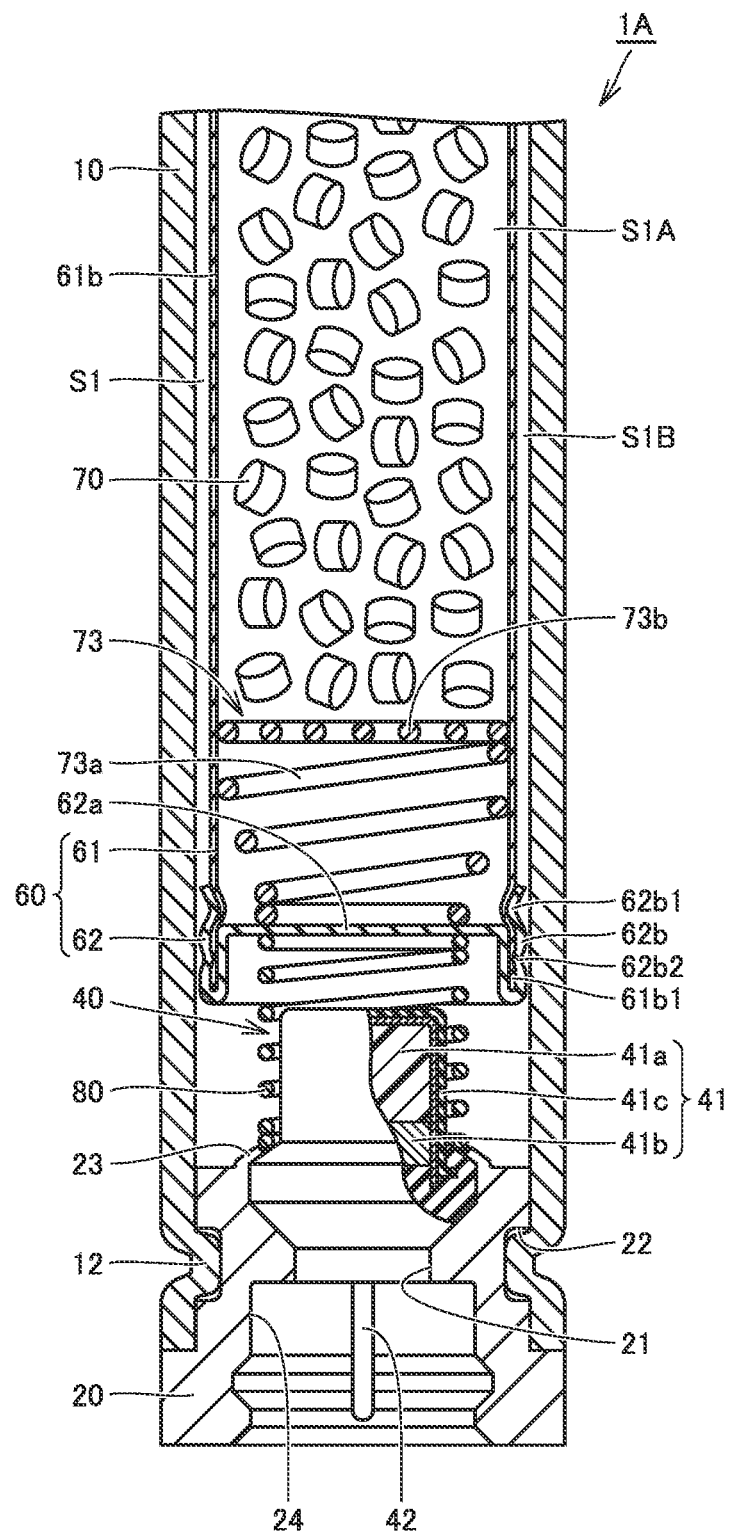
FIG. 2 is an enlarged cross-sectional view of a vicinity of an igniter of the cylinder type gas generator shown in FIG. 1.
Figure 3:
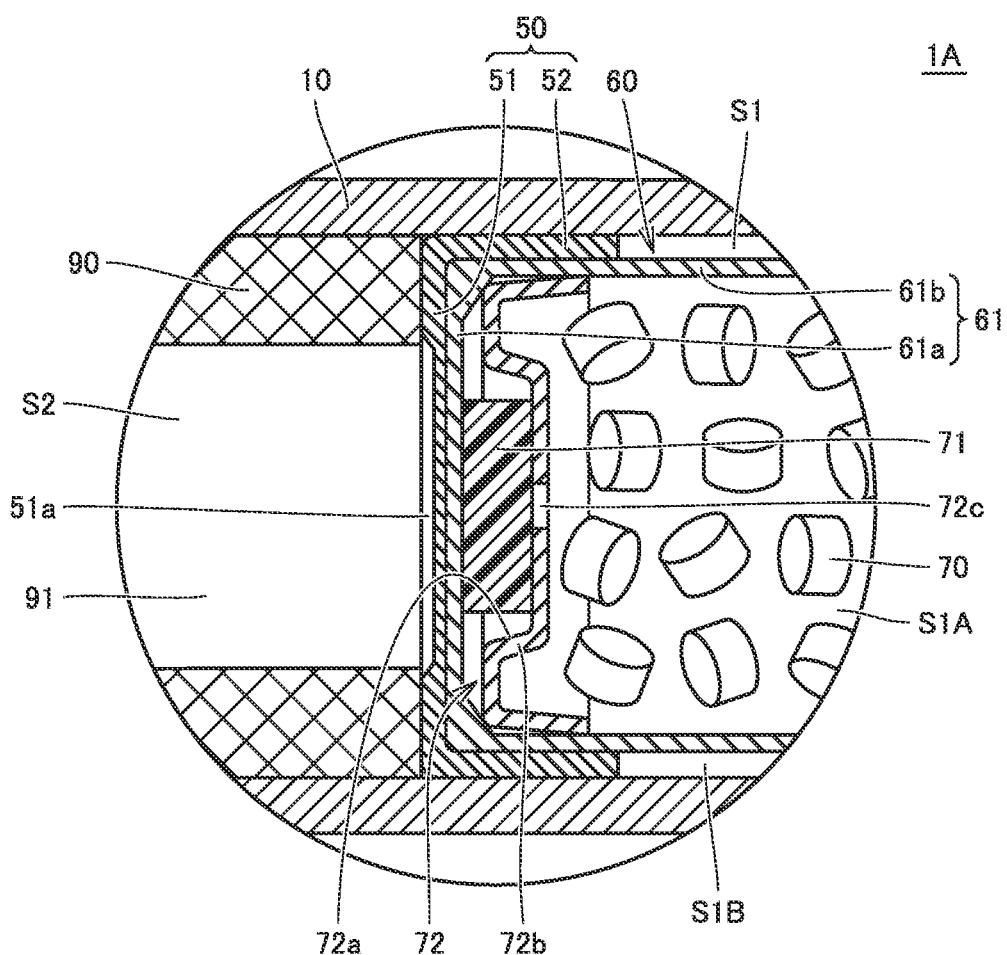
FIG. 3 is an enlarged cross-sectional view of the vicinity of a partition member of the cylinder type gas generator shown in FIG. 1.

FIG. 1 is a schematic diagram of a cylinder type gas generator according to a first embodiment. FIGS. 2 and 3 are an enlarged cross-sectional view of the vicinity of an igniter and an enlarged cross-sectional view of the vicinity of a partition member, of the cylinder type gas generator shown in FIG. 1, respectively. A construction of a cylinder type gas generator 1A according to the present embodiment will initially be described with reference to FIGS. 1 to 3.

As shown in FIG. 1, cylinder type gas generator 1A according to the present embodiment has an elongated columnar outer geometry and has an elongated cylindrical housing having closed one and the other end portions located in an axial direction. The housing includes a housing main body 10, a holder 20, and a closing member 30.

An igniter 40, a partition member 50, a gastight container 60, a gas generating agent 70, an autoignition agent 71, a division member 72, a spring member 73, a coil spring 80, and a filter 90 as internal components are accommodated in the housing constituted of housing main body 10, holder 20, and closing member 30. In the housing, a combustion chamber S1 where gas generating agent 70 among the internal components described above is mainly arranged and a filter chamber S2 where filter 90 is arranged are located.

Housing main body 10 is made of an elongated cylindrical member which implements a circumferential wall portion of the housing and has an opening provided at each of opposing ends in the axial direction. Holder 20 is formed from a cylindrical member including a through portion 21 which extends in a direction the same as the axial direction of housing main body 10, and includes in its outer circumferential surface, an annular groove portion 22 for fixing by swaging which will be described later. Closing member 30 is formed from a member in a shape of a disc having a prescribed thickness and includes in its circumferential surface, an annular groove portion 31 for fixing by swaging which will be described later. Annular groove portions 22 and 31 for fixing by swaging are provided in the outer circumferential surface of holder 20 and the circumferential surface of closing member 30, respectively, as extending in the circumferential direction.

Housing main body 10 may be formed from a member made of a metal such as stainless steel, iron steel, an aluminum alloy, or a stainless alloy or from a cylindrically formed press-formed product by press-working of a rolled steel plate represented by SPCE. Alternatively, housing main body 10 may be formed from an electric resistance welded tube represented by STKM.

In particular, when housing main body 10 is formed from a press-formed product of a rolled steel plate or an electric resistance welded tube, housing main body 10 can be formed more inexpensively and readily and with much lighter weight than when the housing main body is formed from a member made of a metal such as stainless steel or iron steel.

Holder 20 and closing member 30 are formed from a member made of a metal such as stainless steel, iron steel, an aluminum alloy, or a stainless alloy.

Holder 20 is fixed to housing main body 10 so as to close one axial opening end of housing main body 10. Specifically, while holder 20 is inserted in one opening end of housing main body 10, housing main body 10 in a portion corresponding to annular groove portion 22 provided in the outer circumferential surface of holder 20 is engaged with annular groove portion 22 as being decreased in diameter radially inward, so that holder 20 is fixed by swaging to housing main body 10. Thus, one axial end portion of the housing is implemented by holder 20.

Closing member 30 is fixed to housing main body 10 so as to close the other axial opening end of housing main body 10. Specifically, while closing member 30 is inserted in the other opening end of housing main body 10, housing main body 10 in a portion corresponding to annular groove portion 31 provided in the circumferential surface of closing member 30 is engaged with annular groove portion 31 as being decreased in diameter radially inward so that closing member 30 is fixed by swaging to housing main body 10. The other axial end portion of the housing is thus implemented by closing member 30.

Such fixing by swaging is called omnidirectional swaging in which housing main body 10 is substantially uniformly decreased in diameter radially inward. With such omnidirectional swaging, swaging portions 12 and 13 are provided in housing main body 10. Swaging portions 12 and 13 are thus in direct contact with annular groove portions 22 and 31, respectively, so that a gap is prevented from being provided therebetween.

A structure for assembly of holder 20 and closing member 30 to housing main body 10 is not limited to the assembly structure described above, and another assembly structure may be adopted. Alternatively, housing main body 10 and closing member 30 do not have to be separate members, and they may be implemented as one member in a shape of a cylinder with bottom.

As shown in FIGS. 1 and 2, igniter 40 is assembled to above-described one axial end portion of the housing by being supported by holder 20. Igniter 40 serves to burn gas generating agent 70 and is set to face a space in the housing.

Igniter 40 includes an ignition portion 41 and a pair of terminal pins 42. Ignition portion 41 includes an ignition agent 41a, a plug 41b, and a cup body 41c. Ignition agent 41a is arranged in a space defined by plug 41b and cup body 41c, and accommodated in ignition portion 41. In ignition portion 41, a resistor (bridge wire) is attached to be connected to the pair of terminal pins 42, and ignition agent 41a is loaded in ignition portion 41 so as to surround the resistor or to be in contact with the resistor. An enhancer agent may be loaded in ignition portion 41 as necessary.

Here, a Nichrome wire or a resistance wire made of an alloy containing platinum and tungsten is generally used as a resistor, and ZPP (zirconium potassium perchlorate), ZWPP (zirconium tungsten potassium perchlorate), lead tricinate, or the like is generally made use of as the ignition agent. A composition composed of metal powders/oxidizing agent represented by $B/KNO_3$, $B/NaNO_3$, or $Sr(NO_3)_2$, a composition composed of titanium hydride/potassium perchlorate, or a composition composed of B/5-aminotetrazole/potassium nitrate/molybdenum trioxide is employed as the enhancer agent. Cup body 41c provided in ignition portion 41 includes a metal cup.

Upon sensing collision, a prescribed amount of current flows in a resistor through terminal pin 42. As the prescribed amount of current flows in the resistor, Joule heat is generated in the resistor and ignition agent 41a starts burning. Thermal particles at a high temperature caused by burning cleave cup body 41c where ignition agent 41a is accommodated. A time period from flow of a current in the resistor until activation of igniter 40 is generally not longer than 2 milliseconds in a case that the Nichrome wire is employed as the resistor.

Igniter 40 is fixed to holder 20 by a swaging portion 23 provided in holder 20. More specifically, holder 20 includes swaging portion 23 for fixing by swaging of igniter 40 at the axial end portion which faces a space in the housing. Swaging portion 23 described above is swaged while igniter 40 is inserted in through portion 21 and abuts on a wall portion in a portion defining through portion 21 of holder 20, so that igniter 40 is fixed to holder 20 as being held by holder 20.

Igniter 40 is thus assembled to holder 20 such that ignition portion 41 thereof protrudes toward the inside of the housing. Therefore, at the time of activation of igniter 40, cup body 41c is cleaved by ignition of ignition agent 41a, which opens cup body 41c.

A depression portion 24 continuous to through portion 21 described above is provided at the axial end portion of holder 20 exposed to the outside. Depression portion 24 provides a female connector portion which receives a male connector (not shown) of a harness for connecting igniter 40 and a control unit (not shown) to each other, and a portion close to a tip end of terminal pin 42 of igniter 40 is located as being exposed in depression portion 24. A male connector is inserted in depression portion 24 serving as the female connector portion so that electrical conduction between a core of the harness and terminal pin 42 is achieved.

As shown in FIGS. 1 and 3, partition member 50 is arranged at a prescribed position in the space in the housing. Partition member 50 is a member for partitioning the space in the housing into combustion chamber S1 and filter chamber S2 in the axial direction.

Partition member 50 is in a shape of a cylinder with bottom, and formed from a member made of a metal such as stainless steel, iron steel, an aluminum alloy, or a stainless alloy. Partition member 50 includes a separation wall portion 51 in a form of a flat plate arranged to be orthogonal to the axial direction of housing main body 10 and an annular wall portion 52 in a form of a cylindrical wall erected from a circumferential edge of separation wall portion 51. Partition member 50 is arranged such that a main surface on an outer side of separation wall portion 51 abuts on filter 90 and an outer circumferential surface of annular wall portion 52 abuts on an inner circumferential surface of housing main body 10.

A score 51a is provided in a main surface of separation wall portion 51 which abuts on filter 90. Score 51a serves to provide an opening as a result of rupture of separation wall portion 51 with increase in internal pressure in combustion chamber S1 as a result of burning of gas generating agent 70, and it is provided, for example, as a plurality of grooves provided to radially intersect with one another. Score 51a is provided in a portion in filter 90 opposed to a hollow portion 91.

As shown in FIGS. 1 to 3, in a space (that is, combustion chamber S1) lying between holder 20 and partition member 50 in the space in the housing, gastight container 60 and coil spring 80 are arranged. In a gas generating agent accommodation chamber S1A which is a space in gastight container 60, gas generating agent 70, autoignition agent 71, division member 72, and spring member 73 are accommodated.

Gastight container 60 serves to seal gas generating agent 70 accommodated therein, and it is formed from a weak member which melts or bursts with heat or a pressure generated by activation of igniter 40. Gastight container 60 is in a substantially cylindrical shape having opposing ends closed and arranged substantially coaxially with the housing.

More specifically, gastight container 60 includes a container body 61 and a lid body 62, and gas generating agent accommodation chamber S1A described above is defined in gastight container 60 by joining container body 61 and lid body 62 to each other.

Container body 61 includes a top wall portion 61a in a form of a flat plate and a cylindrical sidewall portion 61b which extends from a circumferential edge of top wall portion 61a. Lid body 62 includes a bottom portion 62a in a form of a flat plate located in container body 61 by being inserted in an opening end 61b1 of container body 61 and a fold-over portion 62b which extends from a circumferential edge of bottom portion 62a and is partly curved to cover an inner circumferential surface, an end surface, and an outer circumferential surface of opening end 61b1 of container body 61.

Joint between container body 61 and lid body 62 described above is achieved between opening end 61b1 of container body 61 and fold-over portion 62b of lid body 62 provided to cover the same. More specifically, a first swaging portion 62b1 and a second swaging portion 62b2 are provided in fold-over portion 62b provided to cover opening end 61b1 of container body 61, so as to achieve joint between container body 61 and lid body 62. First swaging portion 62b1 and second swaging portion 62b2 are each formed by decreasing a diameter of a prescribed part of container body 61 radially inward.

As described above, container body 61 and lid body 62 are each formed from a weak member which melts or bursts with heat or a pressure generated by activation of igniter 40. More specifically, lid body 62 is formed from a weak member which melts or bursts with heat or a pressure generated by burning of ignition agent 41a or an enhancer agent in addition thereto in response to activation of igniter 40, and container body 61 is formed from a weak member which melts or bursts with heat or a pressure generated by burning of gas generating agent 70 brought about by activation of igniter 40.

Specifically, container body 61 and lid body 62 are each preferably formed from a press-formed product made of a metal such as copper, aluminum, a copper alloy, an aluminum alloy, or the like, and they are joined to each other as described above so that gas generating agent 70 accommodated therein is hermetically sealed from the outside.

Gastight container 60 is inserted in housing main body 10 such that top wall portion 61a of container body 61 is located on a side of partition member 50 and bottom portion 62a of lid body 62 is located on a side of holder 20. Bottom portion 62a of lid body 62 thus faces ignition portion 41 of igniter 40.

More specifically, the end portion of gastight container 60 on a side where top wall portion 61a is located is fitted into partition member 50 by being inserted into the inside of partition member 50 and an end portion on a side where bottom portion 62a of gastight container 60 is located is loosely fitted to housing main body 10. Gastight container 60 is thus fixed as being positioned with respect to housing main body 10 and arranged at a prescribed distance from an inner circumferential surface of housing main body 10.

Therefore, a heat insulating layer S1B which is a space of a prescribed size is provided between housing main body 10 forming the circumferential wall portion of the housing and sidewall portion 61b of gastight container 60, and heat insulating layer S1B extends substantially cylindrically along the axial direction of combustion chamber S1.

Cylindrical heat insulating layer S1B is thus provided between gastight container 60 in which gas generating agent 70 is accommodated and housing main body 10 so that increase in temperature of gas generating agent 70 due to external heating even in case of fire in a vehicle equipped with an air bag apparatus incorporating cylinder type gas generator 1A can effectively be suppressed.

Specifically, by providing heat insulating layer S1B in a portion radially outside gastight container 60 where gas generating agent 70 is accommodated, heat insulating layer S1B serves as a thermal resistance and heat of housing main body 10 is less likely to conduct to gas generating agent 70. A temperature of gas generating agent 70 at the time when an autoignition operation started as a result of spontaneous ignition of autoignition agent 71 which will be described later is exhibited can relatively be suppressed. Therefore, increase in internal pressure in the housing at the time of the autoignition operation can significantly be suppressed.

Heat insulating layer S1B is preferably lower in thermal conductivity than housing main body 10, and it is provided as an air layer in the present embodiment. Heat insulating layer S1B, however, does not necessarily have to be provided as the air layer, and it may be provided as a gas layer filled with another gas or as a vacuum layer. In addition, heat insulating layer S1B may be provided by arranging various heat insulating members in the space.

At an end portion on the side of partition member 50 in gas generating agent accommodation chamber S1A provided in the inside of gastight container 60, autoignition agent 71 and division member 72 are arranged, and at an end portion on the side of holder 20, spring member 73 is arranged. In a portion except for the end portion on the side of partition member 50 and the end portion on the side of holder 20 in gas generating agent accommodation chamber S1A provided in the inside of gastight container 60, gas generating agent 70 is arranged.

Gas generating agent 70 is an agent which is ignited by thermal particles produced as a result of activation of igniter 40 and produces gas as it burns. A non-azide-based gas generating agent is preferably employed as gas generating agent 70, and gas generating agent 70 is formed as a molding generally containing a fuel, an oxidizing agent, and an additive.

For the fuel, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-aminotetrazole, and the like are suitably made use of.

As the oxidizing agent, for example, basic metal salt such as basic copper nitrate and basic copper carbonate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of.

As the additive, a binder, a slag formation agent, a combustion modifier, or the like is exemplified. As the binder, for example, an organic binder such as metal salt of carboxymethyl cellulose and stearate, or an inorganic binder such as synthetic hydrotalcite and Japanese acid clay can suitably be made use of. As the slag formation agent, silicon nitride, silica, Japanese acid clay, or the like can suitably be made use of. As the combustion modifier, a metal oxide, ferrosilicon, activated carbon, graphite, or the like can suitably be made use of.

A shape of a molding of gas generating agent 70 includes various shapes such as a particulate shape including a granule, a pellet, and a column, and a disc shape. Among columnar moldings, a molding with holes having through holes in the molding (such as a cylindrical shape with a single hole or a cylindrical shape with multiple holes) is also made use of. These shapes are preferably selected as appropriate depending on specifications of an air bag apparatus in which cylinder type gas generator 1A is incorporated, and for example, a shape optimal for the specifications is preferably selected by selecting a shape allowing change over time of a rate of generation of gas during burning of gas generating agent 70. Furthermore, in addition to a shape of gas generating agent 70, a size of a molding or an amount thereof for filling is preferably selected as appropriate, in consideration of a linear burning velocity, a pressure exponent, or the like of gas generating agent 70.

Autoignition agent 71 is an agent which self-ignites without depending on activation of igniter 40, and made of pellets formed in a columnar shape of a flat profile in the present embodiment. Autoignition agent 71 self-ignites at a temperature lower than a spontaneous combustion temperature of gas generating agent 70, and it serves not to induce an abnormal operation due to external heating of cylinder type gas generator 1A in case of fire in a vehicle equipped with an air bag apparatus incorporating cylinder type gas generator 1A.

Division member 72 is a member for dividing gas generating agent accommodation chamber S1A in the axial direction of the housing. Division member 72 includes a positioning recess 72a in a portion thereof that faces partition member 50 in the axial direction of the circumferential wall portion of housing main body 10 and includes a cylindrical fixing portion 72b in a form of a skirt around an outer periphery. In a bottom portion of positioning recess 72a of division member 72, a single through hole 72c or a plurality of through holes 72c for communication between a pair of spaces (that is, a space where gas generating agent 70 is accommodated and a space where autoignition agent 71 is accommodated) divided by division member 72 is/are provided.

Division member 72 is preferably made from a press-formed product made of a metal, and preferably made from a member made of brass that does not rupture or melt, for example, even when gas generating agent 70 burns. Division member 72, however, does not necessarily have to be made of brass, and may be formed of stainless steel, iron steel, iron, aluminum, an aluminum alloy, or the like.

Division member 72 does not necessarily have to be provided with through hole 72c. By providing a score in division member 72, a through hole may be provided therein as a result of burning of gas generating agent 70. Alternatively, without providing a through hole or a score in division member 72, division member 72 itself may be formed from a weak member that ruptures or melts as a result of burning of gas generating agent 70.

Division member 72 is inserted on an inner side of sidewall portion 61b of container body 61 of gastight container 60, and cylindrical fixing portion 72b of division member 72 abuts on the inner circumferential surface of sidewall portion 61b. In other words, division member 72 is press-fitted to sidewall portion 61b of container body 61 to be fixed to gastight container 60.

Some of autoignition agent 71 molded like a pellet is accommodated in positioning recess 72a provided in division member 72. Autoignition agent 71 thus lies between the bottom portion of positioning recess 72a of division member 72 and top wall portion 61a of container body 61. Therefore, autoignition agent 71 abuts on both of division member 72 and container body 61.

According to such a construction, autoignition agent 71 comes in thermal contact with housing main body 10 substantially through a shortest path with division member 72 which is a member made of a metal, the end portion close to top wall portion 61a of gastight container 60 which is a member made of a metal, and partition member 50 which is a member made of a metal being interposed.

Therefore, timing of exhibition of an autoignition operation started as a result of spontaneous ignition of autoignition agent 71 in case of fire in a vehicle becomes earlier, and consequently a temperature of gas generating agent 70 at the time when the autoignition operation is exhibited can be suppressed. Therefore, increase in internal pressure in the housing at the time of the autoignition operation can significantly be suppressed.

Spring member 73 is provided for the purpose of prevention of gas generating agent 70 formed from a molding from being crushed by vibration or the like, and includes a spring portion 73a and a pressing portion 73b formed by bending a metal wire rod. Spring portion 73a is arranged such that one end thereof abuts on bottom portion 62a of gastight container 60 and pressing portion 73b is formed at the other end of the spring portion. Pressing portion 73b is provided, for example, by arrangement of the metal wire rod substantially in parallel at prescribed intervals, and abuts on gas generating agent 70.

Thus, gas generating agent 70 is elastically biased toward partition member 50 by spring member 73 and prevented from moving in gastight container 60. Instead of spring member 73 as described above, a cushion material formed from a member made, for example, of a molding of ceramic fibers, rock wool, a foamed resin (such as foamed silicone, foamed polypropylene, or foamed polyethylene), or rubber represented by chloroprene and EPDM may be made use of.

In a space in combustion chamber S1 located on the side of holder 20 relative to gastight container 60, coil spring 80 which is a component different from spring member 73 described above is arranged. Coil spring 80 is formed by spirally winding a metal wire rod, and unlike spring member 73 described above, it does not include pressing portion 73b as in spring member 73. In the present embodiment, coil spring 80 has a substantially cylindrical outer geometry as a whole by winding of a metal wire rod to be equal in inner diameter at any position in the axial direction.

Coil spring 80 is a member for accommodating dimension variation among various constituent components accommodated in the housing and fixing gastight container 60 in the inside of the housing. Coil spring 80 also serves to appropriately maintain a distance from igniter 40 assembled to the one end portion of the housing to gas generating agent 70 accommodated in gastight container 60.

Therefore, coil spring 80 is interposed between the above-described one end portion in the axial direction of the housing and gastight container 60, and arranged such that one end thereof abuts on holder 20 and/or igniter 40 and the other end thereof abuts on the end portion of gastight container 60 on the side of holder 20. Gastight container 60 is thus elastically biased by coil spring 80 toward partition member 50 on the side of the other end in the axial direction of the housing and fixed to the housing by being sandwiched between partition member 50 described above and coil spring 80.

Coil spring 80 is arranged to surround ignition portion 41 of igniter 40 having the substantially columnar outer geometry. More specifically, coil spring 80 is arranged substantially coaxially with ignition portion 41 to surround ignition portion 41 without interposition of another member between coil spring 80 and ignition portion 41. Coil spring 80 thus includes a surrounding portion 81 in a shape of a winding which is a portion surrounding ignition portion 41 and an extension portion 82 similarly in a shape of a winding that is located closer to gastight container 60 than surrounding portion 81 (see FIG. 4).

With such a construction, in cleavage of cup body 41c of ignition portion 41 at the time of activation of igniter 40, a degree of opening of cup body 41c is restricted by coil spring 80, details of which will be described later.

As shown in FIG. 1, in the space in the housing, filter 90 is arranged in the space (that is, filter chamber S2) lying between closing member 30 and partition member 50. Filter 90 is formed from a cylindrical member having hollow portion 91 extending in a direction the same as the axial direction of housing main body 10, and has axial one end surface abutting on closing member 30 and axial the other end surface abutting on partition member 50.

Filter 90 functions as cooling means for cooling gas by removing heat from the gas at a high temperature when the gas produced as a result of burning of gas generating agent 70 passes through this filter 90 and also functions as removal means for removing slag (residues) or the like contained in the gas. As described above, by making use of filter 90 formed from a cylindrical member, a flow resistance against gas which flows through filter chamber S2 at the time of activation is suppressed and an efficient flow of the gas can be achieved.

A filter formed from an aggregate of metal wire rods or metal mesh materials suitably made of stainless steel or iron steel can be made use of as filter 90. Specifically, a wire gauze of stocking stitch, a plain-woven wire gauze, an aggregate of crimped metal wire rods, or a material obtained by compressing the former with the use of a press can be made use of.

Alternatively, a material obtained by winding a perforated metal plate can also be made use of as filter 90. In this case, as the perforated metal plate, for example, expanded metal obtained by making staggered cuts in a metal plate and providing holes by widening the cuts to thereby work the metal plate in a mesh, hook metal obtained by perforating a metal plate and collapsing burrs caused around a periphery of the hole for flattening, or the like can be made use of.

A plurality of gas discharge openings 11 are provided along the circumferential direction and the axial direction in housing main body 10 in a portion defining filter chamber S2. The plurality of gas discharge openings 11 serve for guiding gas which has passed through filter 90 to the outside of the housing.

An operation of cylinder type gas generator 1A according to the present embodiment when it is activated will now be described with reference to FIG. 1.

With reference to FIG. 1, when a vehicle on which cylinder type gas generator 1A according to the present embodiment is mounted collides, collision is sensed by collision sensing means separately provided in the vehicle and igniter 40 is activated based thereon by current feed caused by a control unit separately provided in the vehicle.

When igniter 40 is activated, ignition agent 41a or an enhancer agent in addition thereto burns. Then, a pressure in ignition portion 41 increases, which cleaves cup body 41c of ignition portion 41, and thermal particles resulting from burning of ignition agent 41a flow to the outside of ignition portion 41.

Coil spring 80 described above provides directivity to thermal particles which flow out of ignition portion 41, so that the thermal particles thus reach bottom portion 62a of gastight container 60. Thus, bottom portion 62a of gastight container 60 melts or bursts with heat or a pressure generated by activation of igniter 40 and thermal particles described above reach gas generating agent 70.

Thermal particles which have reached gas generating agent 70 burn gas generating agent 70 so that a large amount of gas is produced. Accordingly, a pressure and a temperature in gas generating agent accommodation chamber S1A increase, sidewall portion 61b of gastight container 60 bursts or melts and autoignition agent 71 burns, and furthermore top wall portion 61a of gastight container 60 bursts or melts.

As gas generating agent 70 burns, a pressure in the entire combustion chamber S1 further increases and an internal pressure in combustion chamber S1 reaches a prescribed pressure. Thus, a portion of partition member 50 where score 51a is provided ruptures. Thus, a communication hole is provided in partition member 50 in a portion opposed to hollow portion 91 of filter 90, and combustion chamber S1 and filter chamber S2 communicate with each other through the communication hole.

Accordingly, gas produced in combustion chamber S1 flows into filter chamber S2 through a communication hole provided in partition member 50. The gas which has flowed into filter chamber S2 flows along the axial direction through hollow portion 91 of filter 90, thereafter changes its direction toward a radial direction, and passes through filter 90. At that time, heat is removed through filter 90 and the gas is cooled, and slag contained in the gas is removed by filter 90.

The gas which has passed through filter 90 is discharged to the outside of the housing through gas discharge opening 11. The discharged gas is introduced into an air bag provided adjacently to cylinder type gas generator 1A to thereby expand and develop the air bag.

As shown in FIG. 2, in cylinder type gas generator 1A according to the present embodiment, as described above, coil spring 80 interposed between the one end portion (that is, holder 20) in the axial direction of the housing and gastight container 60 is arranged substantially coaxially with ignition portion 41 to surround ignition portion 41 without interposition of another member between the coil spring and ignition portion 41 of igniter 40.

According to the construction as such, firstly, ignition portion 41 is surrounded by surrounding portion 81 (see FIG. 4) of coil spring 80, so that cleavage in a sidewall portion of cup body 41c or outward deformation of the sidewall portion at the time of cleavage of cup body 41c of ignition portion 41 can be suppressed. Therefore, an opening can be provided mainly at a tip end portion which is a portion of cup body 41c located on the side of gas generating agent 70.

Secondly, at the time when the opening is provided at the tip end portion of cup body 41c as a result of cleavage of cup body 41c of ignition portion 41, the opening portion of cup body 41c comes in contact with extension portion 82 (see FIG. 4) of coil spring 80 and further outward deformation can be suppressed. Therefore, extension portion 82 of coil spring 80 and the opening portion of cup body 41c also function as a kind of a guide that determines a direction of travel of thermal particles.

Therefore, the direction of travel of thermal particles produced in ignition portion 41 concentrates in the axial direction of housing main body 10 and thermal particles can efficiently be guided to gas generating agent 70. Therefore, coil spring 80 exhibits not only a function to fix gastight container 60 described above in the inside of the housing but also a function to efficiently guide thermal particles produced in igniter 40 at the time of activation to gas generating agent 70, and a member such as a combustion control cover that has conventionally been required is no longer necessary.

Thus, with cylinder type gas generator 1A according to the present embodiment, the number of components can be smaller than in a conventional example. Accordingly, not only assembly works are simplified, but also the weight of the gas generator as a whole can be reduced. Therefore, while good gas output characteristics are maintained, both of reduction in weight and reduction in manufacturing cost can be achieved.

In order to efficiently guide thermal particles produced in ignition portion 41 to gas generating agent 70, directivity should moderately be given to thermal particles. A degree of directivity given to thermal particles is determined, in particular, by a clearance between ignition portion 41 and surrounding portion 81 which is a portion of coil spring 80 surrounding ignition portion 41. A preferred range of the clearance will be described below with reference to FIG. 4.

Figure 4:
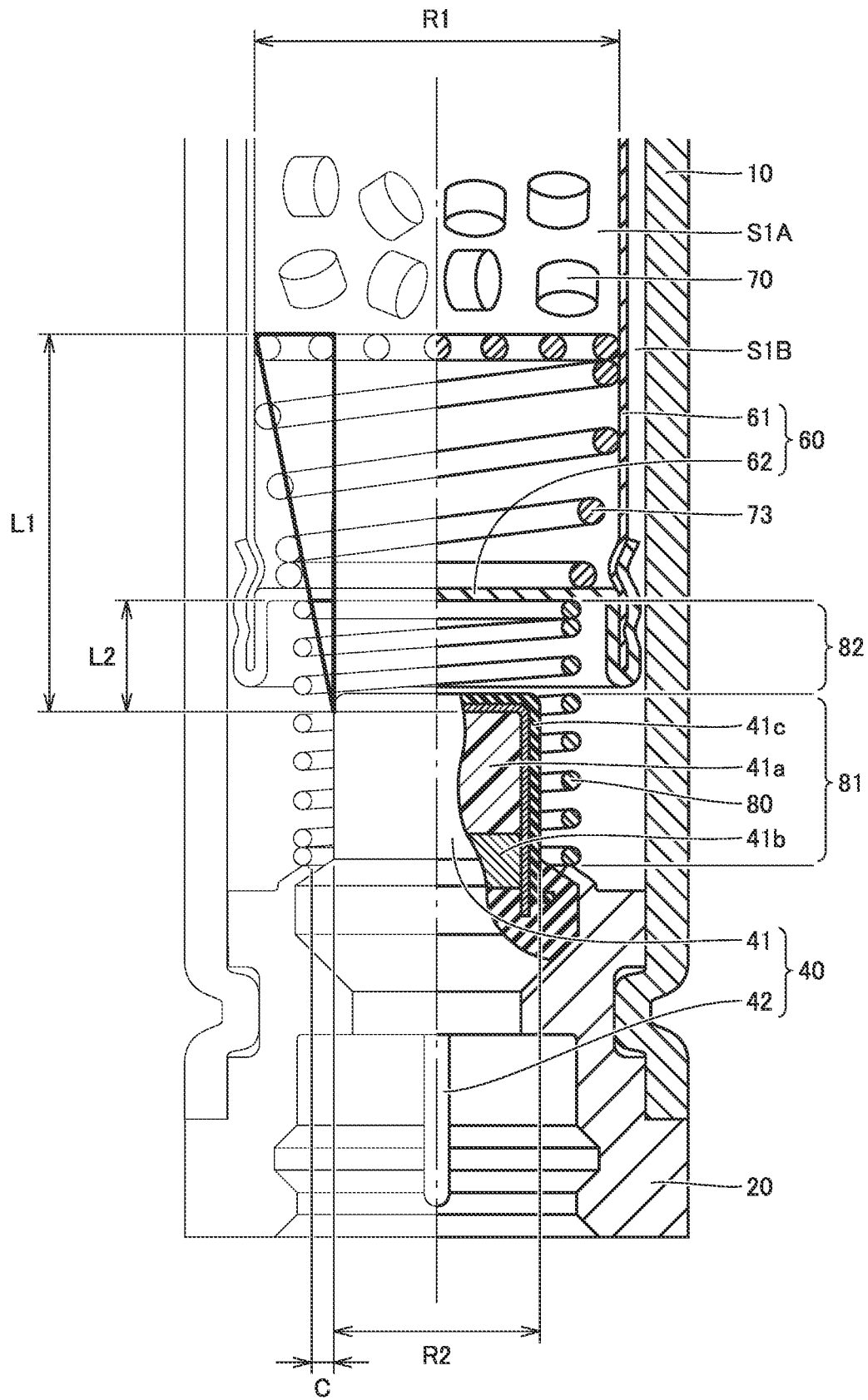
FIG. 4 is a diagram for illustrating a preferred range of a clearance in the cylinder type gas generator according to an embodiment.

FIG. 4 is a diagram for illustrating a preferred range of the clearance in the cylinder type gas generator according to the present embodiment.

From a point of view of prevention of cleavage or deformation of the sidewall portion of cup body 41c, preferably, there is no clearance between ignition portion 41 and surrounding portion 81. It is not necessarily easy, however, to press-fit coil spring 80 made from a metal wire rod to ignition portion 41, and from a point of view of facilitated assembly works, a slight clearance is desirably provided.

It has been confirmed in results of a verification test which will be described later that a clearance not larger than 1.0 [mm] is preferred. In consideration of the fact that extension portion 82 and the opening portion of cup body 41c function also as a kind of the guide, however, an upper limit can be determined as below.

Referring to FIG. 4, specifically, a clearance C between ignition portion 41 and surrounding portion 81 preferably satisfies a condition of $0 < C \leq (R1-R2) \times (L2/L1)/2$, where R1 represents an inner diameter of gas generating agent accommodation chamber S1A, R2 represents an outer diameter of ignition portion 41, L1 represents a distance along the axial direction of housing main body 10 from the portion of ignition portion 41 where ignition agent 41a is accommodated to gas generating agent accommodation chamber S1A, and L2 represents a distance along the axial direction of housing main body 10 from the portion of ignition portion 41 where ignition agent 41a is accommodated to gastight container 60.

As the condition is satisfied, gas generating agent accommodation chamber S1A is located within a range where thermal particles are guided by extension portion 82 and the opening portion of cup body 41c when viewed from ignition portion 41. Therefore, thermal particles can very efficiently be guided to gas generating agent accommodation chamber S1A. Therefore, in order to reliably obtain the effect described above, the condition is preferably satisfied.

Figure 5:
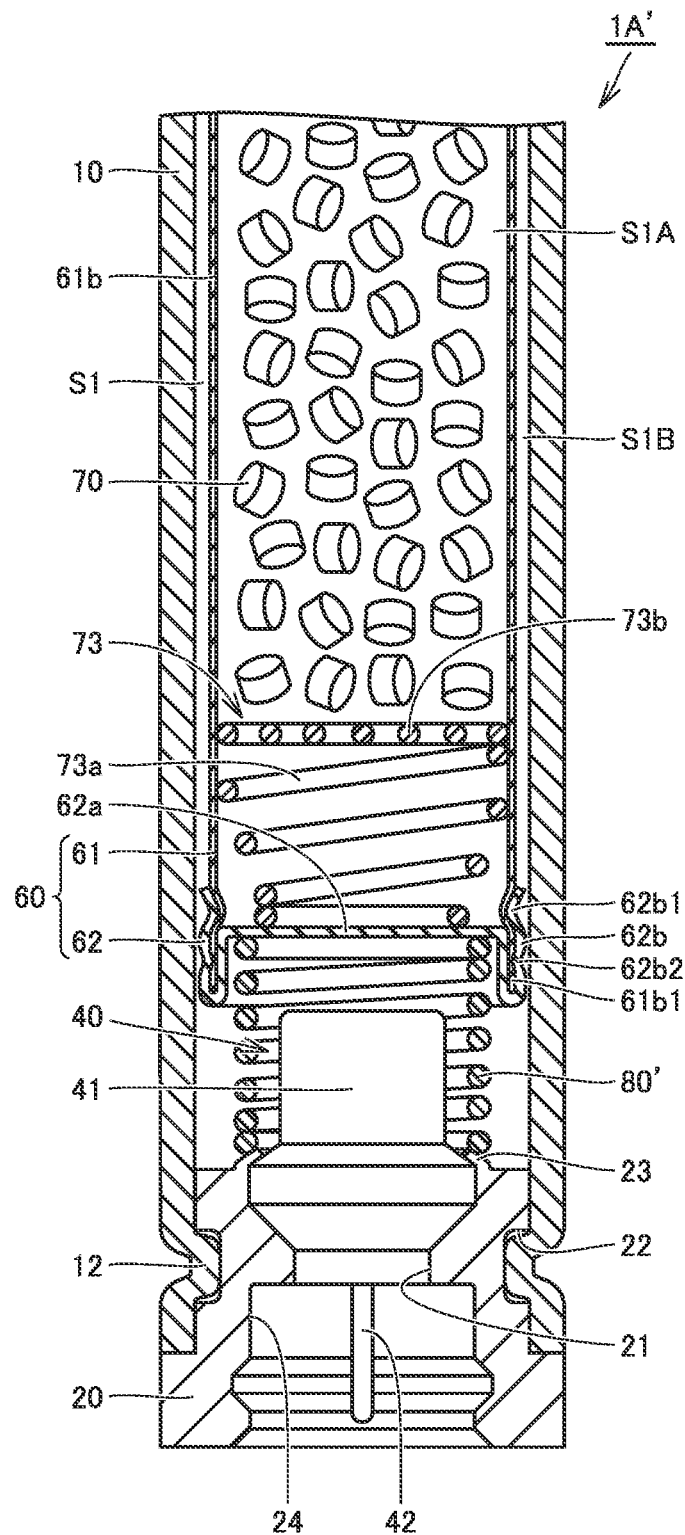
FIG. 5 is an enlarged cross-sectional view of the vicinity of the igniter, showing an exemplary modification of the cylinder type gas generator according to the first embodiment.

FIG. 5 is an enlarged cross-sectional view of the vicinity of the igniter, showing an exemplary modification of the cylinder type gas generator according to the present embodiment. As shown in FIG. 5, a cylinder type gas generator 1A' includes a coil spring 80' different from coil spring 80 described above as compared with cylinder type gas generator 1A described above.

Specifically, coil spring 80' is larger than coil spring 80 described above in diameter of the metal wire rod, inner diameter, and the number of turns. According to such a construction as well, the above-described effect can be obtained.

Thus, not only the inner diameter of the coil spring that determines the size of the clearance between ignition portion 41 and surrounding portion 81 described above but also design factors such as the diameter or the number of turns of the metal wire rod for the coil spring can variously be modified as necessary. For example, from a point of view of facilitated assembly works or reduction in weight, the diameter of the metal wire rod is preferably smaller, whereas from a point of view of securer fixation of the gastight container or enhanced directivity of thermal particles described above, the diameter of the metal wire rod is preferably larger. From a point of view of reduction in weight, the number of turns of the metal wire rod is preferably smaller, whereas from a point of view of enhanced directivity of thermal particles described above, it is preferably larger. Furthermore, a material for the metal wire rod for the coil spring can also variously be modified.

Second Embodiment

Figure 6:
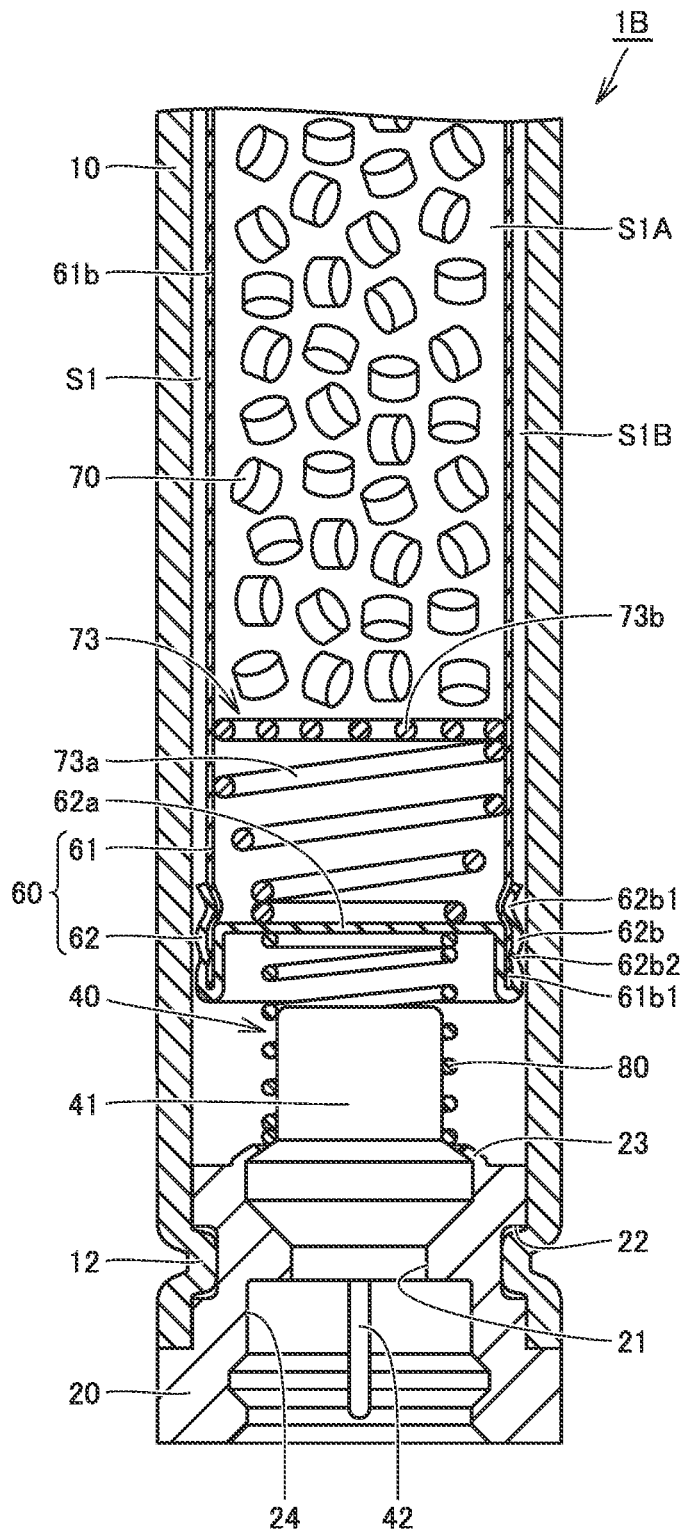
FIG. 6 is an enlarged cross-sectional view of the vicinity of the igniter of a cylinder type gas generator according to a second embodiment.

FIG. 6 is an enlarged cross-sectional view of the vicinity of the igniter of a cylinder type gas generator according to a second embodiment. A cylinder type gas generator 1B according to the present embodiment will now be described with reference to FIG. 6.

As shown in FIG. 6, cylinder type gas generator 1B according to the present embodiment is different from cylinder type gas generator 1A according to the first embodiment described above in inner diameter of coil spring 80, so that surrounding portion 81 (see FIG. 4) which is the portion of coil spring 80 surrounding ignition portion 41 is in contact with ignition portion 41. In other words, there is no clearance between ignition portion 41 and surrounding portion 81 in cylinder type gas generator 1B according to the present embodiment.

According to such a construction, coil spring 80 should be press-fitted to ignition portion 41 in assembly works. As compared with an example where a clearance is provided, workability is slightly poorer, however, the sidewall portion of cup body 41c can more reliably be prevented from cleaving or deforming. Therefore, when the construction as in the present embodiment is adopted as well, while good gas output characteristics are maintained, both of reduction in weight and reduction in manufacturing cost can be achieved as in the first embodiment described above.

Third Embodiment

Figure 7:
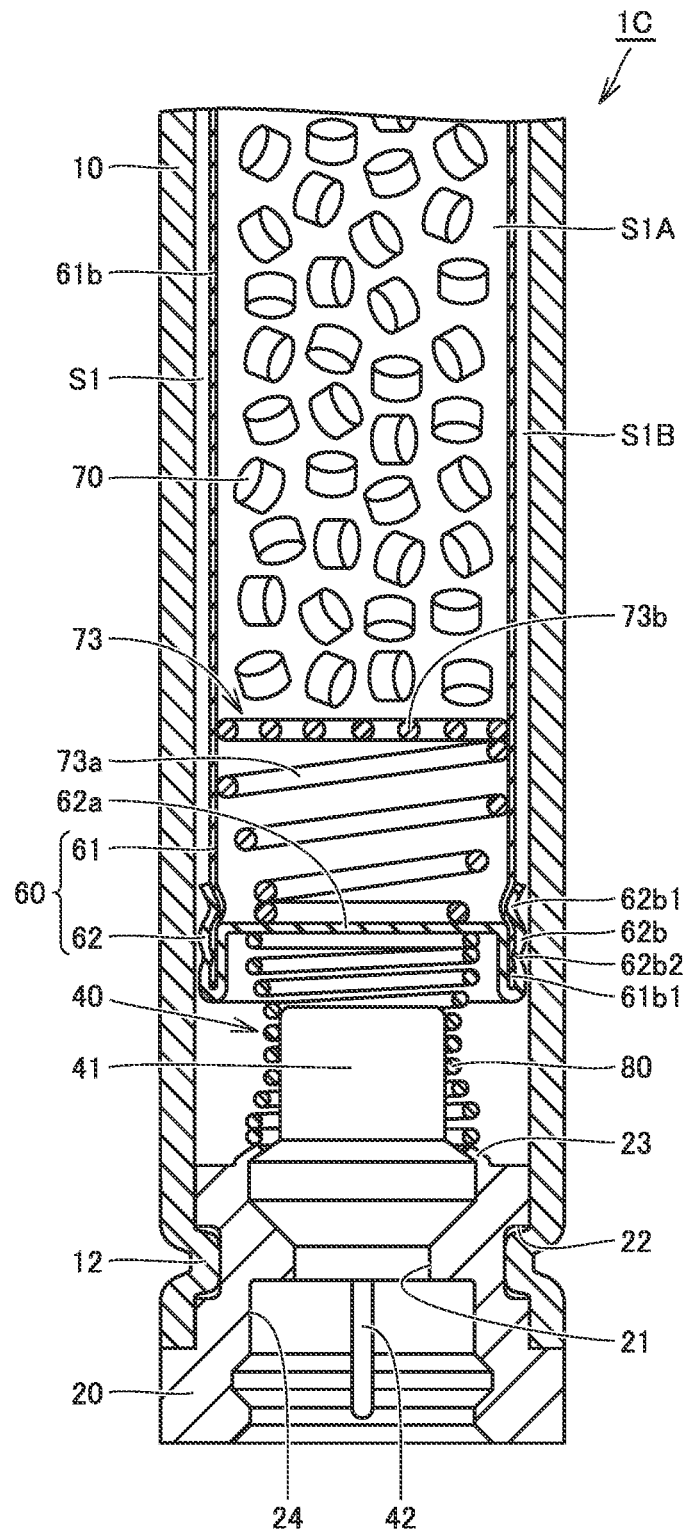
FIG. 7 is an enlarged cross-sectional view of the vicinity of the igniter of a cylinder type gas generator according to a third embodiment.

FIG. 7 is an enlarged cross-sectional view of the vicinity of the igniter of a cylinder type gas generator according to a third embodiment. A cylinder type gas generator 1C according to the present embodiment will now be described with reference to FIG. 7.

As shown in FIG. 7, cylinder type gas generator 1C according to the present embodiment is different from cylinder type gas generator 1A according to the first embodiment described above in shape of coil spring 80. Specifically, coil spring 80 includes a small-diameter portion (that is, a portion relatively smaller in inner diameter) in a central portion in the axial direction and a large-diameter portion (that is, a portion relatively larger in inner diameter) at each of opposing end portions in the axial direction.

Of the small-diameter portion and the large-diameter portions of coil spring 80 described above, the small-diameter portion and the large-diameter portion located on the side of holder 20 are located to surround ignition portion 41 of igniter 40, and such portions correspond to surrounding portion 81 (see FIG. 4) described above. The small-diameter portion of the portion of coil spring 80 that surrounds ignition portion 41 of igniter 40 is press-fitted to ignition portion 41 to come in contact with ignition portion 41. In other words, in cylinder type gas generator 1C according to the present embodiment, there is no clearance between ignition portion 41 and the small-diameter portion of surrounding portion 81.

According to such a construction, coil spring 80 should be press-fitted to ignition portion 41 in assembly works. As compared with an example where a clearance is provided, workability is slightly poorer, however, the sidewall portion of cup body 41c can more reliably be prevented from cleaving or deforming. Therefore, when the construction as in the present embodiment is adopted as well, while good gas output characteristics are maintained, both of reduction in weight and reduction in manufacturing cost can be achieved as in the first embodiment described above.

By providing the large-diameter portion at each of the opposing end portions in the axial direction of coil spring 80 as in the present embodiment, a direction of insertion of coil spring 80 is not restricted at the time of assembly, and press-fitting of coil spring 80 to ignition portion 41 can be facilitated.

(Verification Test)

A verification test conducted for confirming the effects of the present invention will be described below. In the verification test, cylinder type gas generators according to Verification Examples 1 to 5 based on the first embodiment described above were actually prototyped, and separately therefrom, cylinder type gas generators according to Comparative Examples 1 and 2 not based on the first embodiment described above were prototyped. Gas output characteristics were measured by actually activating the cylinder type gas generators according to Verification Examples 1 to 5 and Comparative Examples 1 and 2.

Figure 8:
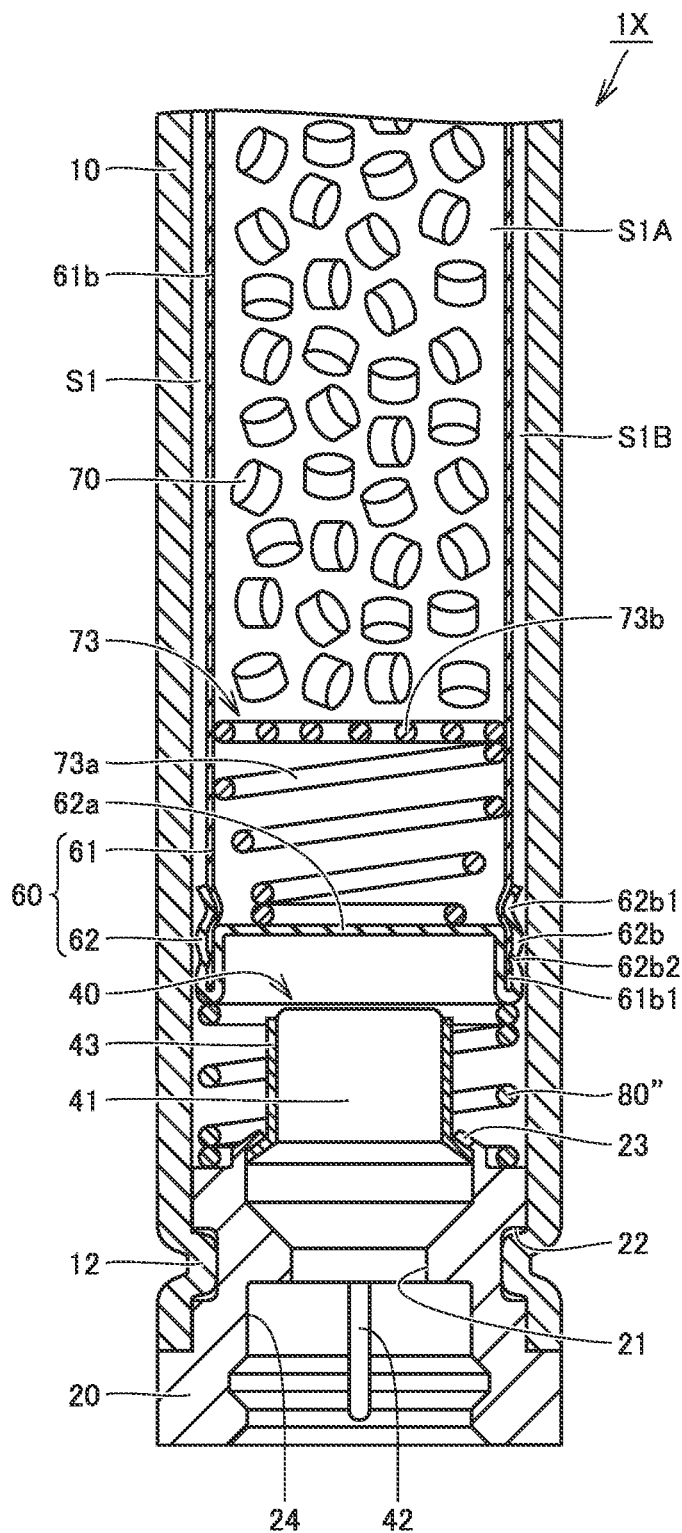
FIG. 8 is an enlarged cross-sectional view of the vicinity of the igniter of a cylinder type gas generator according to Comparative Example 1.

FIG. 8 is an enlarged cross-sectional view of the vicinity of the igniter of a cylinder type gas generator according to Comparative Example 1. FIG. 9 shows a table of a test condition and a test result in the verification test.

As shown in FIG. 9, each of the cylinder type gas generators according to Verification Examples 1 to 5 did not include a combustion control cover 43 (see FIG. 8) included in a cylinder type gas generator 1X according to Comparative Example 1 which will be described later, and it was constructed such that coil spring 80 restricted a degree of opening of cup body 41c (see FIG. 2 or the like) of ignition portion 41. Among Verification Examples 1 to 5, the inner diameter, the diameter, and the number of turns of employed coil spring 80 were different, whereas a free length of the coil spring was identical.

As shown in FIG. 8, in cylinder type gas generator 1X according to Comparative Example 1, substantially cylindrical combustion control cover 43 made of a metal was externally attached to ignition portion 41 of igniter 40. Combustion control cover 43 served to efficiently guide thermal particles produced in igniter 40 at the time of activation to gas generating agent 70. Combustion control cover 43 was fixed by swaging to holder 20 together with igniter 40 by swaging portion 23 provided in holder 20.

In cylinder type gas generator 1X according to Comparative Example 1 thus constructed, combustion control cover 43 instead of coil spring 80 described in the first embodiment above gave directivity to thermal particles produced in ignition portion 41. Therefore, in cylinder type gas generator 1X according to Comparative Example 1, a coil spring 80" was provided only for fixing gastight container 60 in the inside of the housing, and coil spring 80" did not restrict the degree of opening of cup body 41c (see FIG. 2 or the like) of ignition portion 41.

Though not shown, the cylinder type gas generator according to Comparative Example 2 corresponds to cylinder type gas generator 1X according to Comparative Example 1 described above from which combustion control cover 43 was removed. In cylinder type gas generator 1X according to Comparative Example 2, coil spring 80" was located to face ignition portion 41. Coil spring 80", however, was arranged at a long distance from ignition portion 41, and hence coil spring 80" did not restrict the degree of opening of cup body 41c (see FIG. 2 or the like) of ignition portion 41 as is clear also from the test result which will be described later.

The cylinder type gas generators according to Verification Examples 1 to 5 and Comparative Examples 1 and 2 were constructed to be different only in construction of the coil spring or the combustion control cover described above and otherwise constructed to be identical. In each case, gas generating agent accommodation chamber S1A had inner diameter R1 of 16.1 [mm], ignition portion 41 had outer diameter R2 of 8.2 [mm], distance L1 along the axial direction of housing main body 10 from the portion of ignition portion 41 where ignition agent 41a was accommodated to gas generating agent accommodation chamber S1A was 11.1 [mm], and distance L2 along the axial direction of housing main body 10 from the portion of ignition portion 41 where ignition agent 41a was accommodated to gastight container 60 was 2.9 [mm].

In the verification test, five samples of the cylinder type gas generator according to each of Verification Examples 1 to 5 and Comparative Examples 1 and 2 were prepared, each sample was set in a gastight tank and activated therein, and change over time of a pressure in the tank at that time was measured. An output indicator in FIG. 9 is used for evaluation of gas output characteristics, and represents a time from activation of the igniter until change in pressure in the tank.

As shown in FIG. 9, it was confirmed that the cylinder type gas generator according to each of Verification Examples 1 to 4 where clearance C between the ignition portion and the surrounding portion was not larger than 1.0 [mm] was equivalent in gas output characteristics to the cylinder type gas generator according to Comparative Example 1 provided with the combustion control cover. In particular, it was confirmed that the cylinder type gas generator according to each of Verification Examples 1 to 3 achieved an improved output indicator and gas output was obtained earlier after activation as compared with the cylinder type gas generator according to Comparative Example 1.

The cylinder type gas generator according to Verification Example 5 in which clearance C between the ignition portion and the surrounding portion was 1.9 [mm]was merely comparable in obtained gas output characteristics to the cylinder type gas generator according to Comparative Example 2 not provided with the combustion control cover. It was also experimentally confirmed that clearance C between the ignition portion and the surrounding portion was nevertheless an important factor.

FIG. 9 shows evaluation of the cylinder type gas generators according to Verification Examples 1 to 5 and Comparative Examples 1 and 2 described above in aspects of the manufacturing cost and the gas output characteristics as "good" or "satisfactory" and shows total evaluation based on such evaluation on both aspects as "outstanding" or "good" or "satisfactory".

(Other Forms)

In the embodiments and the modification thereof of the present invention described above, an example in which a coil spring with a substantially cylindrical outer geometry as a whole that is obtained by winding of a metal wire rod such that an inner diameter thereof is identical at any position in the axial direction or a coil spring constructed as being partially different in inner diameter thereof is employed as the coil spring that gives directivity to thermal particles produced in the ignition portion of the igniter is illustrated and described. The coil spring having such an outer geometry, however, does not necessarily have to be employed, but a coil spring tapered or inversely tapered as a whole may be employed. In any case, a reasonable effect can be obtained so long as the coil spring is constructed to restrict the degree of opening of the cup body of the ignition portion.

In the embodiments and the modification thereof of the present invention described above, though an example in which one end of the coil spring abuts on the swaging portion provided in the holder for fixing the igniter is illustrated and described, one end of the coil spring may abut on the surface of the holder located on an outer side relative to the swaging portion. As described above, one end of the coil spring does not necessarily have to abut on the holder but the coil spring may be fixed only by press-fitting to the ignition portion without abutting on the holder.

Though an example in which the present invention is applied to the cylinder type gas generator constructed to provide a heat insulating layer in the housing radially outside of the gastight container is illustrated and described in the embodiments and the modification thereof of the present invention described above, the heat insulating layer is not necessarily an essential component. The present invention can naturally be applied also to a cylinder type gas generator without a heat insulating layer as described above, and in that case, the sidewall portion of the gastight container abuts on the inner circumferential surface of the housing main body by press-fitting of the gastight container into the housing main body.

Though an example in which the present invention is applied to the cylinder type gas generator in which not only the gas generating agent but also the autoignition agent, the division member, and the coil spring are accommodated in the gastight container is illustrated and described in the embodiments and the modification thereof of the present invention described above, the construction does not necessarily have to be as such, and at least a gas generating agent should only be accommodated in the gastight container.

In addition, though an example in which the present invention is applied to a cylinder type gas generator incorporated in a side air bag apparatus is illustrated and described in the embodiments and the modification thereof of the present invention described above, applications of the present invention are not limited thereto and the present invention can be applied also to a cylinder type gas generator incorporated in a curtain air bag apparatus, a knee air bag apparatus, or a seat cushion air bag apparatus or what is called a T-shaped gas generator having an elongated outer geometry similarly to the cylinder type gas generator.

The embodiments and the modification thereof disclosed herein are thus illustrative and non-restrictive in every respect. The technical scope of the present invention is delimited by the terms of the claims, and includes any modifications within the scope and meaning equivalent to the terms of the claims.

REFERENCE SIGNS LIST 1A, 1A', 1B, 1X cylinder type gas generator; 10 housing main body; 11 gas discharge opening; 12, 13 swaging portion; 20 holder; 21 through portion; 22 annular groove portion; 23 swaging portion; 24 depression portion; 30 closing member; 31 annular groove portion; 40 igniter; 41 ignition portion; 41a ignition agent; 41b plug; 41c cup body; 42 terminal pin; 43 combustion control cover; 50 partition member; 51 separation wall portion; 51a score; 52 annular wall portion; 60 gastight container; 61 container body; 61a top wall portion; 61b sidewall portion; 61b1 opening end; 62 lid body; 62a bottom portion; 62b fold-over portion; 62b1 first swaging portion; 62b2 second swaging portion; 70 gas generating agent; 71 autoignition agent; 72 division member; 72a positioning recess; 72b cylindrical fixing portion; 72c through hole; 73 spring member; 73a spring portion; 73b pressing portion; 80, 80', 80" coil spring; 81 surrounding portion; 82 extension portion; 90 filter; 91 hollow portion; S1 combustion chamber; S1A gas generating agent accommodation chamber; S1B heat insulating layer; and S2 filter chamber

The invention claimed is:

1. A gas generator comprising:
an elongated cylindrical housing having axial end portions closed and having a circumferential wall;
a gas generating agent arranged inside of the housing;
an igniter including an ignition portion where an ignition agent for burning the gas generating agent is accommodated, the igniter being assembled to one end portion of the housing such that the ignition portion protrudes toward the inside of the housing;
a gastight container arranged in the inside of the housing, the gastight container defining a gas generating agent accommodation chamber where the gas generating agent is accommodated, the gastight container melting or bursting with heat or a pressure generated by activation of the igniter; and
a coil spring interposed between the one end portion of the housing and the gastight container, the coil spring fixing the gastight container in the inside of the housing by biasing the gastight container toward an other end portion of the housing, wherein
the ignition portion includes a cup body cleaved by ignition of the ignition agent at time of activation of the igniter, and the coil spring is arranged substantially coaxially with the ignition portion to surround the ignition portion without interposition of another member between the coil spring and the ignition portion, such that a degree of opening of the cup body is restricted at time of cleavage of the cup body.

2. The gas generator according to claim 1, wherein the ignition portion has a substantially columnar outer geometry, and the coil spring has a substantially cylindrical outer geometry.

3. The gas generator according to claim 2, wherein a condition of $0<C\leq(R1-R2)\times(L2/L1)/2$ is satisfied, where R1 represents an inner diameter of the gas generating agent accommodation chamber, R2 represents an outer diameter of the ignition portion, L1 represents a distance along an axial direction of the housing from a portion of the ignition portion where the ignition agent is accommodated to the gas generating agent accommodation chamber, L2 represents a distance along the axial direction of the housing from the portion of the ignition portion where the ignition agent is accommodated to the gastight container, and C represents a clearance between the ignition portion and a surrounding portion which is a portion of the coil spring surrounding the ignition portion.

4. The gas generator according to claim 3, wherein the clearance is not larger than 1.0.

5. The gas generator according to claim 1, wherein a surrounding portion which is a portion of the coil spring surrounding the ignition portion is in contact with the ignition portion.

* * * * *